United States Patent [19]

Lee et al.

[11] Patent Number: 5,067,508
[45] Date of Patent: Nov. 26, 1991

[54] ACTIVATION OF WATER-IN-OIL EMULSIONS OF FRICTION REDUCING POLYMERS FOR USE IN SALINE FLUIDS

[75] Inventors: Yung N. Lee; Fred R. Wiggins, both of Ponca City, Okla.

[73] Assignee: Conoco Inc., Ponca City, Okla.

[21] Appl. No.: 614,408

[22] Filed: Nov. 16, 1990

[51] Int. Cl.$^5$ .............................................. F17D 1/16
[52] U.S. Cl. ........................................ 137/13; 137/896
[58] Field of Search .................................. 137/13, 896

[56] References Cited

U.S. PATENT DOCUMENTS

| | | |
|---|---|---|
| 3,601,079 | 8/1971 | Giles et al. |
| 3,929,088 | 12/1975 | DuBrow et al. |
| 4,049,054 | 9/1977 | Wier. |
| 4,212,312 | 7/1980 | Titus ........................................ 137/13 |
| 4,722,363 | 2/1988 | Allyn ................................... 137/13 X |
| 4,751,937 | 6/1988 | Shinomura ............................ 137/13 |

*Primary Examiner*—Alan Cohan

[57] ABSTRACT

Friction loss in a saline liquid flowing through a conduit is reduced by combining fresh water and a water-in-oil emulsion of a water soluble friction reducing polymer, subjecting the combined material to mixing to invert the emulsion and introducing the inverted emulsion directly into the flowing saline liquid. In one aspect the water-in-oil emulsion is combined with saline water containing a surfactant to effect inversion prior to introduction of the combination into the flowing saline liquid.

19 Claims, 2 Drawing Sheets

ACTIVATION OF WATER-IN-OIL EMULSIONS OF FRICTION REDUCING POLYMERS FOR USE IN SALINE FLUIDS

BACKGROUND OF THE INVENTION

When fluids flow through a conduit such as a pipeline or a production line from a wellhead, friction results, requiring energy increases for the driving force Sometimes it is desirable to increase the flow rate of fluids through conduits, but this cannot always be satisfactorily accomplished by installing additional booster pumps. In production lines, particularly offshore, the weight and cost of additional pumping capacity can become prohibitive. The flow rate of the fluid through the conduit can alternatively be increased by reducing the friction of the fluid in the conduit.

One method of reducing friction loss in fluids moving through a conduit is to inject into the fluid a substance which is capable of reducing the pressure or friction loss of the fluid moving through the conduit. Such substance must not only reduce the friction loss of the fluid, but must be compatible with the fluid and must not interfere with the intended use of the fluid.

Since the friction reducer must be compatible with the fluid to which it is added, water soluble polymers are ordinarily used where the material being transported is water or a mixture of water and a hydrocarbon oil, particularly when the mixture contains substantial amount of water.

Water soluble polymers are preferably formulated and used as an emulsion where the polymer molecules are partially solubilized in water droplets and the water droplets are emulsified in a hydrocarbon phase. However, when such emulsions are used to reduce friction loss of a saline liquid in a conduit or pipe it has been found that performance of the friction reducing materials is lower than expected. It appears that the reason for this lower performance is that a part or most of the polymer in the emulsion is not activated (inverted) in the flowing fluid. As a result, the polymer is not fully utilized to reduce friction loss. After initial injection of the emulsion whatever portion of the polymer that does not activate immediately remains inactivated even after a substantial period of time.

It would be desirable to provide a method for preactivating (inverting) the polymer in a polymer emulsion prior to introduction of the emulsion into a pipeline or conduit containing a flowing saline liquid.

PRIOR ART

U.S. Pat. No. 3,929,088 to DuBrow et al describes the use of a water and oil emulsion (latex) containing a water soluble polymer in the water phase for increasing the speed and efficiency of jet boats. The emulsion is introduced into the jet which drives the boat to give the jet more coherent properties, i.e. reduce turbulence. Inversion of the emulsion can be effected through shear or the use of surfactants. The latex is mixed in small amounts with intake water prior to discharge into the jet water stream.

U.S. Pat. No. 3,601,079 to Giles et al discloses a method for rapidly producing a water soluble friction reducing solution from solid polymer particles. The solution is obtained by mixing a water soluble polymer with water, rapidly introducing the mixer to a hydration tank where it is hydrated to a uniform polymer solution and then rapidly diluting the polymer solution with by-pass flow of water for injection into a manifold of flowing water.

U.S. Pat. No. 4,049,54 issued to Wier discloses a method for producing a polymer solution treated with a surfactant for flooding a hydrocarbon bearing reservoir. The polymer solution is prepared by dissolving the polymer in fresh water in the substantial absence of a salt; thereafter combining the thus formed polymer solution and a salt solution; and finally adding a surfactant.

THE INVENTION

According to the process of the invention, friction loss in a saline liquid flowing through a conduit is reduced by combining a water-in-oil emulsion of a water soluble friction reducing polymer with fresh water, subjecting the combination to mixing to invert the emulsion and directly introducing the inverted emulsion into the flowing saline liquid.

In one aspect of the invention where the water combined with the water-in-oil emulsion of the water soluble friction reducing polymer is saline water, the saline water is first combined with a surfactant.

DETAILED DESCRIPTION OF THE INVENTION

Figure 1:
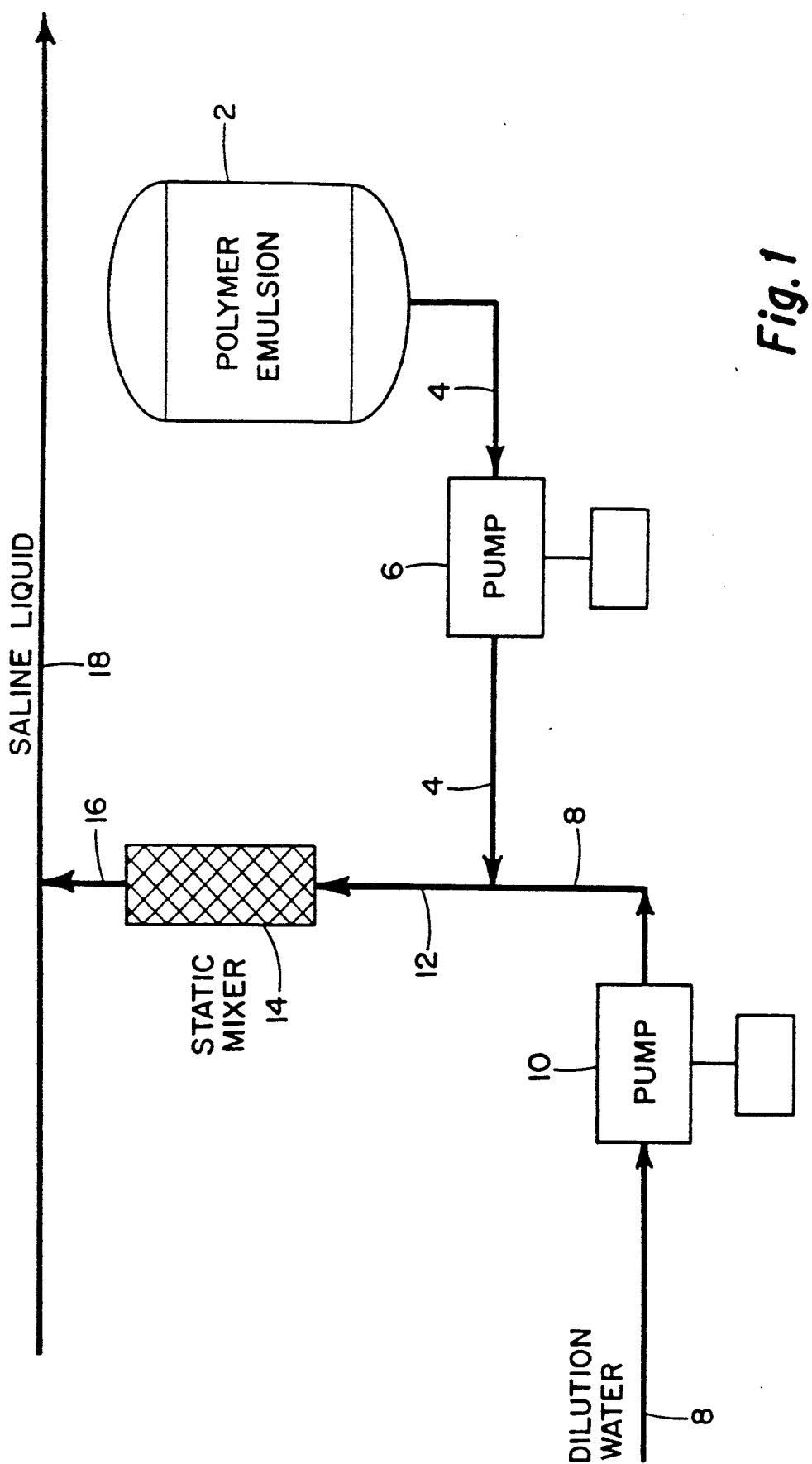
FIG. 1 is a schematic diagram of the process for carrying out one embodiment of the invention.

It has been found that the transportation of water and mixtures of oil and water through a conduit can be greatly facilitated by adding thereto an emulsion of a water soluble friction reducing polymeric material which has been activated (inverted) in accordance with the process of the invention. The water soluble polymeric compounds used for this purpose may be selected from a wide variety of materials including homopolymers and copolymers containing polar groups and having a high molecular weight. A wide range of polymers and copolymers of this type include polyacrylamides, polyalkylene oxide polymers and copolymers, copolymers of acrylamide and acrylate esters, copolymers of acrylamide and methacrylate esters, copolymers of acrylamide and polymers or copolymers of ethylene oxide and/or propylene oxide, mixtures of polyacrylamide polymers and polymers of ethylene oxide and/or propylene oxide, polyvinyl acetates, vinyl sulfonic acid polymers and derivatives thereof. Other materials include natural products such guar gum, polysaccharide and derivatives thereof.

A particularly preferred class of polymers are the polyacrylamides and derivatives thereof. These polymers can be obtained by polymerizing acrylamide with or without suitable comonomers to prepare essentially linear acrylamide polymers. Usually the polymerization is conducted under the influence of a chemical polymerization catalyst such as benzoyl peroxide. These acrylamide polymers are water soluble. In the instance of polyacrylamide, the polymer may be used as obtained after polymerization or the polyacrylamide may be partially hydrolyzed by the reaction thereof with a sufficient amount of a base, such as sodium hydroxide, to hydrolyze a portion of the amid groups present in the polymer molecule.

The polymer emulsions used as starting materials in the process of the invention are water-in-oil emulsions of water soluble friction reducing polymers. The emulsions are characterized by partial solubility of polymer molecules in water droplets which are emulsified in a hydrocarbon phase. Polymer containing emulsions of this type which are well known in the art and which are available commercially are comprised of an aqueous phase usually ranging from between about 30 and about 95 percent by weight of the emulsion. The aqueous phase is defined as the sum of the polymer or copolymer and the water present in the composition. The polymer concentration of the emulsion usually varies from about 10 to about 50 percent by weight and more usually between about 25 and about 40 percent by weight of the emulsion. The organic or oil phase of the emulsion is comprised of an inert hydrophobic liquid which usually comprises from about 5 to about 70 percent by weight of the emulsion, and preferably from about 20 to about 35 percent.

The oils used in preparing these emulsions may be selected from a large group of organic liquids which include such materials as liquid hydrocarbons and substituted liquid hydrocarbons. Inclusive of such hydrocarbon liquids are xylene, toluene, mineral oils, kerosines, naphthas and the like.

Any conventional water-in oil emulsifying agent can be used to prepare the emulsions such as sorbitan monostearate, sorbitan monooleate, and the like. Although the mentioned emulsifiers are used in producing good water-in oil emulsions other surfactants may be employed as long as they are capable of producing stable emulsions. The water-in oil emulsifying agent is usually present in small amounts ranging from about 0.1 to about 10 percent by weight of the emulsion. The water-in oil emulsions may be prepared using any of the conventional procedures which are taught in the art. The types emulsions used in carrying out the process of the invention and their methods of preparation are well known in the art, and do not in themselves constitute a part of the inventive process.

The invention is exemplified by the process shown in FIG. 1. In this figure, a polymer emulsion such as a water-in-oil emulsion of polyacrylamide in a mineral oil, is withdrawn from vessel 2 through line 4 and passed through pump 6. At the same time fresh dilution water is introduced to the process through line 8 and pump 10. The two streams combine in line 12 and are introduced to static mixer 14. In this mixer which is a pass-through mixer the combination of polymer emulsion and dilution water is subjected to high shear which causes the emulsion to invert (activate). When inversion occurs the polymer is released from the emulsion and enters into solution in the dilution water. As inversion takes place the mixture of dilution water and emulsion begins to thicken and quickly forms a thick viscous mixture. The thickening mass is passed directly from static mixer 14 through line 16 and into conduit 18 which contains a flowing saline liquid, such as oil filled brine. Through the action of the mixer, substantially complete inversion of the polymer emulsion is obtained, so that essentially all of the polymer introduced into the flowing saline liquid is effective in producing friction reduction.

The thickened mass of inverted polymer leaving the static mixer is readily introduced to the flowing saline liquid as long as no obstruction is placed in the path of the moving polymer mass between the static mixer and the conduit containing the saline liquid. Once the polymer has inverted it becomes extremely difficult to move through a pump. If the polymer mass leaving the mixer is stored or held in an accumulator, it can only be removed therefrom and introduced to the flowing saline liquid by type of pumping device, which is undesirable. It would be equally undesirable to place a pump or other device for increasing the driving force moving the polymer mass in the line between the mixer and the flowing saline liquid. Any problems associated with moving the inverted polymer are obviated by passing the polymer mass directly and continuously from the mixer through conduit 16 and into the flowing saline liquid without any intervening delay or obstruction.

Sufficient driving force to move the polymer mass from the mixer to the flowing saline liquid is readily provided by the pumps which are used to transfer the polymer emulsion and dilution water to the static mixer. Since these pumps (6 and 10 in FIG. 1) are moving low viscosity materials, they do not encounter the problems which exist in attempting to pass the inverted polymer mass through a pump.

By eliminating the need for a pump between the static mixer and the point at which the polymer mass is introduced into the flowing saline liquid, the process of the invention provides a further advantage. If the polymer mass were passed through a pump it would be subjected to substantial shear, which would significantly reduce the friction reduction properties of the polymers. Elimination of this pump allows the friction reducing polymers to enter the flowing saline liquid at full strength and thus provide maximum friction reduction.

The residence time of the dilution water and emulsion in static mixer 14 is very short, usually less than one second, which allows the thickening polymer mass to pass very quickly into line 16. The inverted polymer is preferably introduced to the flowing saline liquid as soon as possible. The time required for passage of the inverted polymer through line 16 will of course vary depending on the distance from mixer 14 to conduit 18, the size of line 16 and the amount of inverted polymer passing through line 16. Usually the flow time of the inverted polymer through line 16 will vary from about 5 seconds to about 5 minutes, although shorter or longer time periods may be employed.

Friction reduction may be obtained in any saline liquid in the process of the invention. Usually the saline liquid is a brine which is associated with oil and gas reservoirs. However, sea water or brackish waters which are saline in nature may also be benefitted from the process of the invention. Saline liquids usually contain sulfate, carbonate and chlorine ions in the form of salts with alkali metals such as potassium and sodium or with calcium and magnesium. Saline liquids are usually charactized in terms of milligrams per liter of dissolved solids, with seawater usually having between about 35 and about 45 milligrams per liter. As used herein saline liquid includes any liquid containing dissolved solids of the chemical types previously mentioned in an amount above about 10 milligrams per liter.

Any type of mixer which provides high shear and a very short residence time may be used to invert the polymer in the polymer emulsion. Static mixers such as those provided by Koch Engineering, Wichita and Kennex Engineering Company and others are particularly suitable for this purpose. Usually, the residence time of the mixture of polymer emulsion and added water in the mixer is less than one second.

The dilution water which is added to the polymer emulsion prior to the mixer will usually exceed in volume the amount of polymer emulsion and preferably is between about two volumes and about 20 volumes of fresh water per volume of polymer emulsion.

The molecular weight of the polymers and copolymers used as friction reducers in the process of the invention may vary over a wide range, for example, from as low as 100,000 to as high as 50,000,000 based on intrinsic viscosity. The preferred polymers have a molecular weight in excess of 1,000,000 and up to about 15,000,000.

The fluids for which the friction loss can be reduced in the process of the invention include saline waters and mixtures of saline waters and hydrocarbons. The water and oil phases may be saline water and hydrocarbon slurries, emulsions, and micro emulsions or hydrocarbon and saline water slurries, emulsions and micro emulsions. The hydrocarbons may be crude oils including viscous crudes having pour points above about 50° F., partially refined products of crude oil, refined products of crude oil, and any other liquid hydrocarbon materials. The oil phase may include any material containing carbon which is liquid at pipeline conditions, e.g. oils from shale, tar or coal. The oil phase may also contain comminuted solids. The process of the invention is particularly applicable to the reduction of friction loss in mixtures of saline water and crude oil which often occur in the production of crude oil. For example, such mixtures are frequently present in production lines from oil producing areas both on shore and off shore. Such mixtures are also found in production lines from water injection systems used with secondary recovery operations. Mixtures of this type are also present in water disposal systems in refineries and in production areas. Oil field brines or brackish waters are frequently used in oil field water flood operations. The process of the invention also finds application in the transportation and injection of such fluids.

The use of a water-in-oil emulsion of a water soluble friction reducing polymer in a two phase system of saline water and oil can provide an increase in oil production by lowering pressure at the well head. Another use includes the injection of the emulsion into a pipeline moving quantities of oil and saline water. The friction reducer allows the operator to reduce pressure in the line or increase the flow rate, or a combination of the two. Other uses include downhole injection to reduce friction in the oil well tubing.

The amount of friction reducing polymer added to the flowing saline water or flowing mixture of saline water and oil may vary from about 1 to about 10,000 parts per million based on the liquid present in the flowing water or mixture of flowing water and oil. More usually, the amount of polymer added is between about 5 and 1,000 parts per million and preferably from about 10 to about 500 parts per million. When the flowing liquid is a mixture of saline water and oil the amount of water in the water phase is preferably at least 20 percent and more preferably at least 30 percent by volume of the total liquid.

Figure 2:
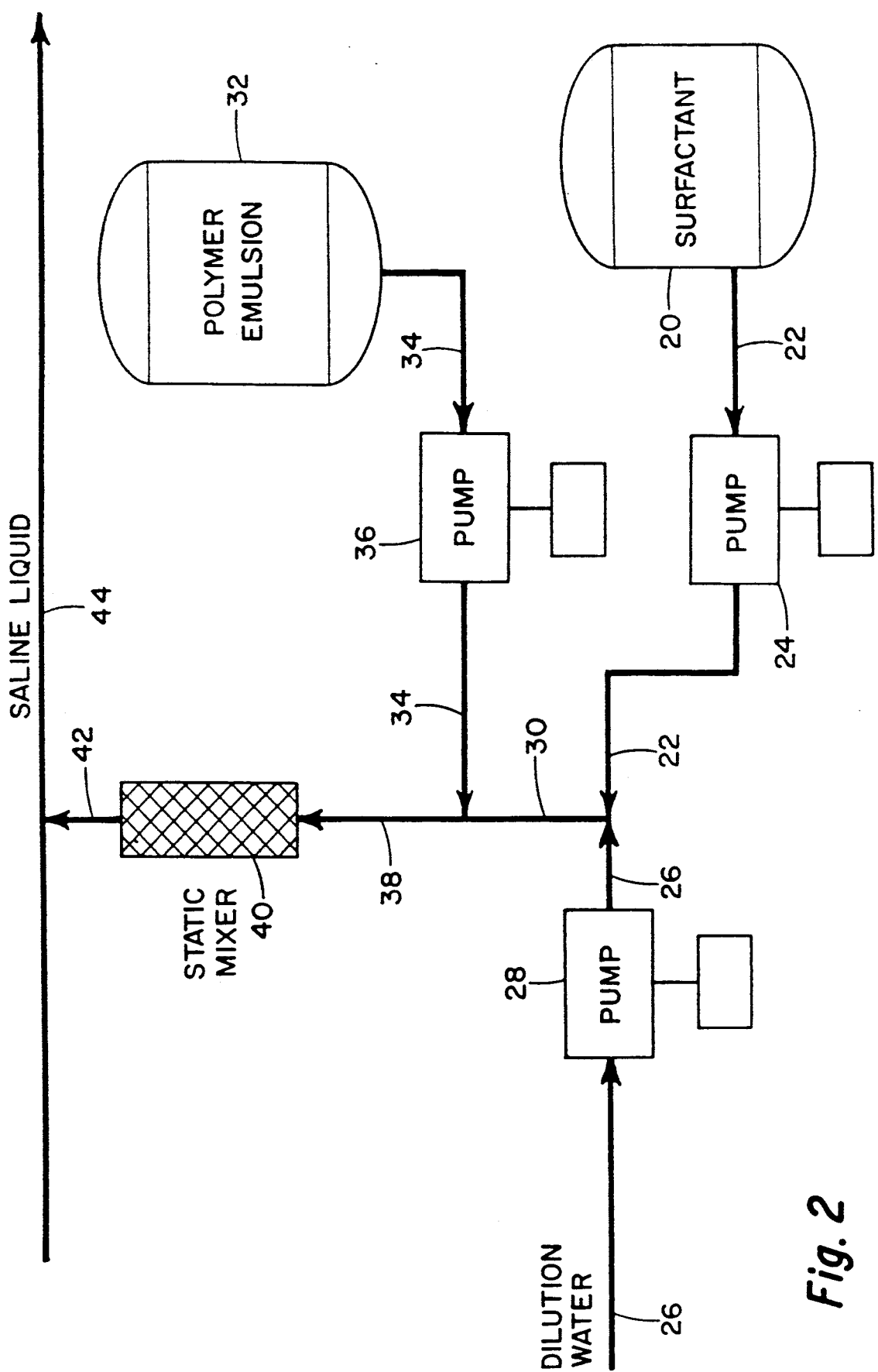
FIG. 2 is a schematic diagram of an alternative process embodiment of the invention.

Introduction of friction reducing polymer into a conduit or pipeline usually occurs on site in the field and often remote from any accessible fresh water. As a result, it becomes necessary to use whatever water is available locally to dilute the polymer emulsion. When the only available water is a brackish water or brine, the process of the invention is modified to provide effective inversion of the polymer as shown in FIG. 2. Referring to FIG. 2 a surfactant is removed from storage tank 20 and introduced through line 22 to pump 24. At the same time, saline dilution water is provided to the system through line 26 and pump 28. The combined materials are passed through line 30 where they are joined with polymer emulsion released from storage vessel 32 through line 34 and pump 36. The combination of polymer emulsion, surfactant and saline dilution water is then introduced through line 38 into static mixer 40. Through the action of the high shear which is obtained in the static mixer and the effect of the surfactant the polymer emulsion is inverted and passes into the saline dilution water wherein it begins to thicken in the same manner as described in the description of FIG. 1. The thickening mixture is passed from static mixer 40 through line 42 and directly into line 44 which contains flowing saline liquid. As in the embodiment where fresh dilution water is used, essentially complete inversion of the polymer in the added saline water and surfactant mixture is effected and all of the polymer becomes available to effect friction reduction in the flowing saline liquid.

Nonionic surfactants are used in carrying out the embodiment of the invention shown in FIG. 2. Such surfactants include ethoxylated alkyl alcohols, having the formula:

$$C_n(OCH_2CH_2)_x$$

wherein
n may vary from 8 to 20 and
x may vary from 1 to 20

Examples of these surfactants include, but are not limited to $C_8(OCH_2CH_2)_4$, $C_{14}(OCH_2CH_2)_{12}$, $C_9(OCH_2CH_2)_8$, $C_{16}(OCH_2CH_2)_{18}$, $C_{12}(OCH_2CH_2)_9$, and the like.

Other surfactants which may be used are the ethoxylated alkylphenols, having the formula:

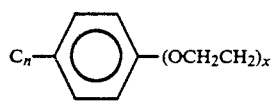

wherein
n may vary from 8 to 20 and
x may vary from 1 to 20
Illustrative examples of these surfactants are:

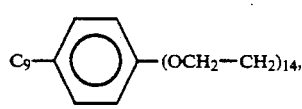

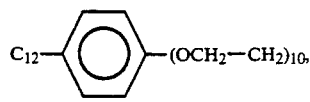

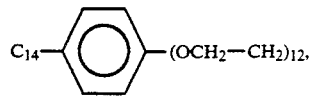

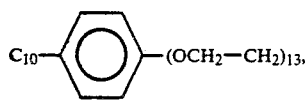

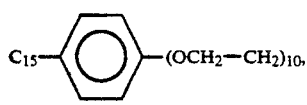

The concentration of surfactant in the saline dilution water is generally in the range of between about 0.5 and about 50 weight percent and preferably between about 1 and about 5 weight percent.

As used herein the term "fresh" water means a non-saline water and includes tap water, deionized water, distilled water, and the like, where the saline content is incidental (small quantities of salts are present in most waters which are available in large quantities).

The following examples are presented to illustrate the present invention, and not to limit it.

EXAMPLE 1

A salt water at 40 mg per liter concentration of sodium chloride salt was prepared in a 500 gallon tank. During each of the runs, the saltwater was pumped through a 2 inch diameter flow loop with a length of 500 feet at 6 ft/sec velocity. Without the addition of friction reducing polymer, a pressure drop of 90 inches of water was obtained over a length of 46 feet of the flow loop. An initial test was made with a water-in-mineral oil emulsion of polyacrylamide friction reducing polymer in which the emulsion was injected into the flow loop and into the flowing stream of saltwater. The pressure drop reading of 90 inches of water without the presence of friction reducing polymer did not change in this run, therefore there was no reduction in pressure drop. Three runs were then carried out in accordance with the process of the invention. In these runs a portion of the same water-in-mineral oil emulsion of polyacrylamide was mixed with a stream of fresh water through a T connection and the mixture was then passed through a Koch static mixer obtained from the Koch Engineering Company. The ratio of fresh water to emulsion in the three runs was 5 to 1, 10 to 1 and 20 to 1 respectively. In each run the mixture of polymer emulsion and fresh water leaving the static mixer was very viscous and pastelike. This mixture was directly introduced into the flow loop containing the flowing stream of water in each run. Immediate drag reduction was obtained in each run as the material mixed into the flowing stream. The polymer concentration in each run was 10 ppm and at this concentration the pressure drop in each run was reduced from 90 inches of water to 36 inches of water, a friction reduction value of 60 percent.

EXAMPLE 2

Additional experiments were carried out in the same manner as above except that the dilution water used was saltwater instead of fresh water. In the control test the polymer was not activated (inverted) and no reduction in pressure drop was obtained. Three additional tests were then carried out using dilution salt water to emulsion ratios of 5 to 1, 10 to 1 and 20 to 1 respectively. In each of these runs a commercial reactant was added to the dilution saltwater just prior to the T. A different surfactant was used for each of the three runs, Union Carbide NP-7, Union Carbide NP-10 and Union Carbide 15-S7. The surfactants NP-7 and NP-10 are nonylphenol ethoxylates in which the number indicates the moles of ethylene oxide present in the surfactant. Union Carbide 15-S7 is a surfactant comprising a secondary alcohol reacted with ethylene oxide. In each of the three runs the ratio of surfactant to emulsion was 1 to 20. In each of these runs the mixture of friction reducing polymer emulsion, added saltwater and surfactant leaving the static mixer was very viscous and pastelike. In each instance the mixture was directly introduced into the flow loop containing the flowing stream of saltwater. At a polymer concentration of 10 ppm a friction reduction of 60 percent was again obtained in each run.

The data in the examples clearly illustrates that at the various embodiments of the invention are most effective in preactivating (inverting) a friction loss reducing polymer in a polymer emulsion for introduction into a flowing stream of saline liquid.

While certain embodiments and details have been shown for purpose of illustrating the present invention it will be apparent to those skilled in the art that various changes and modifications may be made herein without departing from the spirit or scope of the invention.

We claim:

1. A process for reducing the fluid flow friction loss of a fluid comprising a saline liquid which is being transported through a conduit which comprises:
   (a) combining a water-in-oil emulsion of a water soluble friction reducing polymer with water;
   (b) subjecting the combination of water and emulsion to mixing to invert the emulsion; and
   (c) introducing the inverted emulsion and water directly and continuously into the transported fluid.

2. The process of claim 1 in which the water soluble polymer is a polyacrylamide polymer.

3. The process of claim 2 in which the fluid includes hydrocarbon oil.

4. The process of claim 3 in which the fluid contains at least 20 percent by volume of saline liquid.

5. The process of claim 2 in which the aqueous phase of the polymer containing water-in-oil emulsion contains from about 10 to about 50 percent polymer.

6. The process of claim 5 in which the polymer containing water-in-oil emulsion contains from about 30 to about 95 percent aqueous phase and from about 5 to about 70 percent hydrophobic liquid.

7. A process for reducing the fluid flow friction loss of a fluid comprising a saline liquid which is being transported through a conduit which comprises:
   (a) combining a water-in-oil emulsion of a water soluble friction reducing polymer with between about 2 and about 20 volumes of fresh water;
   (b) subjecting the combination of water and emulsion to mixing to invert the emulsion; and
   (c) introducing the inverted emulsion and water directly and continuously into the transported fluid.

8. The process of claim 7 in which the water soluble polymer is a polyacrylamide polymer.

9. The process of claim 8 in which the fluid includes hydrocarbon oil.

10. The process of claim 9 in which the fluid contains at least 20 percent by volume of saline liquid.

11. The process of claim 8 in which the aqueous phase of the polymer containing water-in-oil emulsion contains from about 10 to about 50 weight percent polymer.

12. The process of claim 11 in which the polymer containing emulsion water-in-oil contains from about 30 to about 95 weight percent aqueous phase and from about 5 to about 70 weight percent hydrophobic liquid.

13. Process for reducing the fluid flow friction loss of a fluid comprising a saline liquid which is being transported through a conduit which comprises:
   (a) combining saline water with a surfactant;
   (b) combining a water-in-oil emulsion of a water soluble friction reducing polymer with the combined saline water and surfactant;
   (c) subjecting the combination of (b) to mixing to invert the emulsion; and
   (d) introducing the inverted emulsion, surfactant and saline water directly and continuously into the transported fluid.

14. The process of claim 13 in which the saline water varies from about 2 to about 20 volumes per volume of emulsion and the amount of surfactant varies from about 2 to about 10 percent by weight based on the saline water.

15. The process of claim 13 in which the water soluble polymer is a polyacrylamide polymer.

16. The process of claim 15 in which the fluid contains hydrocarbon oil.

17. The process of claim 16 in which the fluid contains at least 20 percent by volume of saline liquid.

18. The process of claim 15 in which the aqueous phase of the polymer containing water-in-oil emulsion contains from about 10 to about 50 weight percent polymer.

19. The process of claim 18 in which the polymer containing water-in-oil emulsion contains from about 30 to about 95 weight percent aqueous phase and from about 5 to about 70 percent weight percent hydrophobic liquid.

* * * * *